Figure 1:
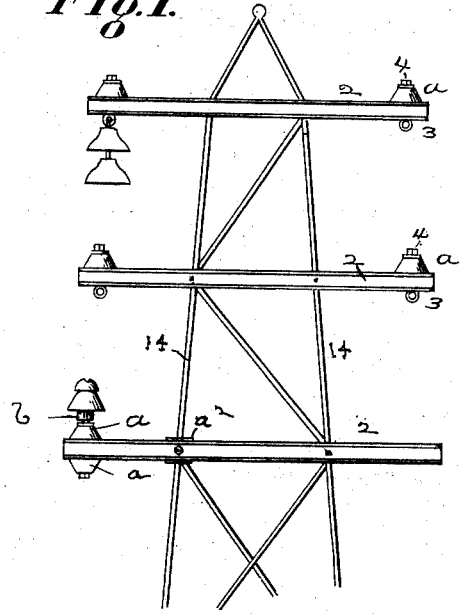

R. S. MASSON.
CURRENT LEAK INDICATOR FOR ELECTRICAL CONDUCTORS.
APPLICATION FILED AUG. 10, 1908.

929,773.

Patented Aug. 3, 1909.

WITNESSES.

INVENTOR.
Raymond S. Masson

UNITED STATES PATENT OFFICE.

RAYMOND S. MASSON, OF BERKELEY, CALIFORNIA.

CURRENT-LEAK INDICATOR FOR ELECTRICAL CONDUCTORS.

No. 929,773.          Specification of Letters Patent.          Patented Aug. 3, 1909.

Application filed August 10, 1908. Serial No. 447,778.

*To all whom it may concern:*

Be it known that I, RAYMOND S. MASSON, a citizen of the United States, residing in the city of Berkeley, Alameda county, and State of California, have invented certain new and useful Improvements in Current-Leak Indicators for Electrical Conductors, of which the following is a specification.

The invention relates to means for indicating leakage of current at the insulators, and at other points where the wires carrying electricity are attached to poles or masts, or other fixed supports.

The object of the invention is to provide means for disclosing or indicating visually the point of escape or leakage where a portion of the current may be passing to the ground at or through the cross-arm or support on the pole or mast, owing to a break or defect in the insulator, or from other causes involving imperfect insulation of the line-wire from its support.

The invention is designed to furnish a visible indication of the point where leakage of current is taking place, through the direct action of the current itself upon the indicator, causing the same to become discolored, or changing the appearance of the indicating-element to such an extent or degree that the departure or change from its normal color or appearance will be readily distinguished by inspection of the line-supports, and the leakage thereby readily detected,—even where it is at a considerable height above the ground from which the inspection is made,—as in the case of masts or towers carrying high-tension light or power lines.

To such end and object chiefly my invention consists in providing between the line-insulator and the cross-arm or support on the mast or tower, a body of insulating material, such as a block of wood, the surface of which is coated, or covered, or treated with a substance having the property of being discolored, or of becoming changed in color or appearance by the action or effect of the electric current. This indicating means is so placed or arranged for operation that as long as the insulator is intact, properly insulating the wire from the cross-arm, the indicating means will retain its normal color or appearance, but as soon as the current is permitted to escape at such point of insulation and reach the cross-arm or support, it will not fail to discolor or change the indicating means to such extent or degree that the same can be distinguished by the eye, and the point of leakage be readily detected.

The following description explains at length the nature of my said invention, and the manner in which I proceed to practice, apply and carry out the same,—reference being had to the accompanying drawing in which I have represented what I consider to be the best form and application of my invention. I do not, however, wish to be understood as limiting and confining myself to such specific form, as the principle of my invention may be embodied in many other forms differing therefrom in details of construction and arrangement of the parts thereof.

Figure 2:
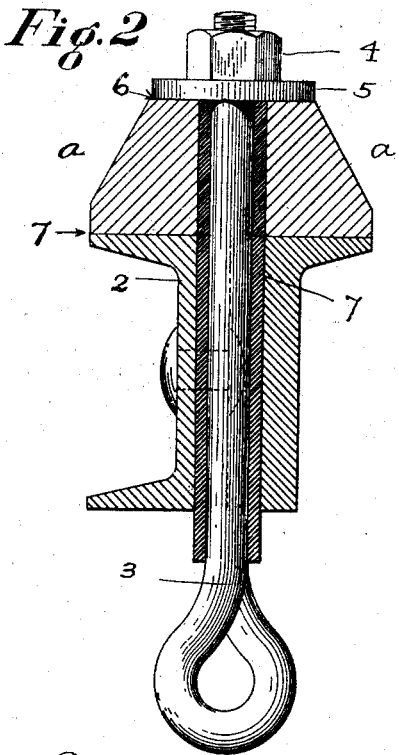
Figure 4:
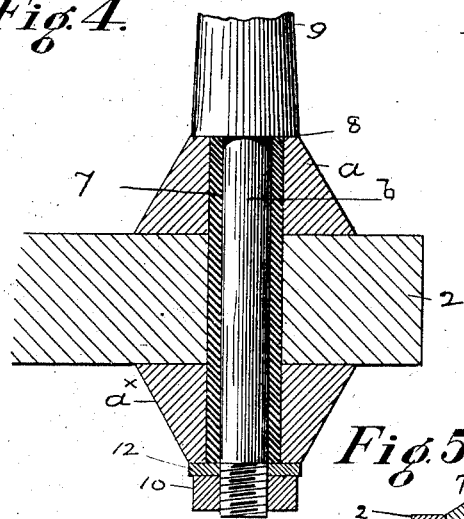
Figure 3:
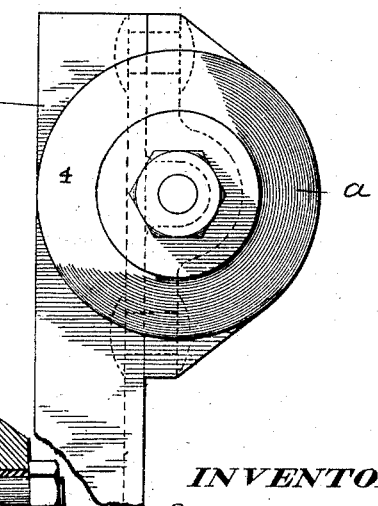
Figure 5:
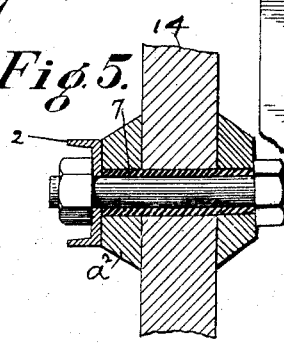

Figure 1 of the drawing illustrates the invention combined for operation with the insulators on a mast in which the cross-arms are formed of iron bars. Fig. 2 is a transverse section, on an enlarged scale, through the cross-arm at one of the points where an insulator is attached,—the section being taken in a vertical plane through the cross-arm and the leak-indicator of my invention, but not through the hanger by which the insulator is suspended from the cross-arm. Fig. 3 is a plan or top view of Fig. 2. Fig. 4 illustrates one way of combining the leak-indicator with a line-insulator that is mounted on the cross-arm, instead of being suspended from it. Fig. 5 is a sectional view illustrating a third form of the invention, located between a cross supporting arm and the framework of a tower.

The preferred form of the leak-indicator of my invention,—as I have shown in the drawing,—is a relatively thick disk or circular block of wood having flat top and bottom faces, and a central aperture for the pin, or bolt, or other means used to fix or attach the insulator to the cross-arm. In Figs. 2 and 3 this block *a* is placed on top of the arm 2, and is held in position by the bolt 3 that forms the suspending means for the insulator,—the bolt being inserted through the block *a* and secured by a nut and washer 4—5 on the threaded end of the bolt. The metal of the cross-arm is separated from that part of the bolt 3 which passes through it, by insulation of any well known character, usually in the form of a sleeve or tubular bushing, as indicated at 7. The nut 4, being screwed down against the block *a*, holds the same in place.

In the application of said leak-indicator of my invention to a standing-insulator, or one of the kind which is mounted on top of the support, instead of being suspended from beneath it, the block $a$ is placed in the same manner upon the top of the cross-arm, and around the upright pin $b$; the only difference being that the insulator is situated above, and not below, the leak-indicator.

In the arrangement shown in Fig. 4, the pin is provided with a shoulder 8 below the threaded end 9 on which the insulator is screwed, and the block is confined between the top face of the cross-arm and the shoulder of the insulator-pin. The lower end of the pin being threaded for a nut, 10, is of proper length to take a block $a^\times$ which is placed between the bottom of the cross-arm and the nut and washer 10—12 before the nut is screwed down. In this arrangement the pin carrying the line insulator is provided with two leak-indicators instead of one.

In both arrangements of the leak-indicator above described and shown, the block should be of sufficient dimension in height to properly insulate the bolt or the pin from the cross-arm, and particularly to afford a surface of sufficient area to be so readily discernible from the ground, or other view-point, that the discoloration or change in the appearance of its surface under the action of the leaking current will be noticeable under ordinary conditions. Such area of surface is provided by making the block of conical form, with a base as large as the width of the cross-arm will accommodate. The inclined sides of the block will then present a greater area of surface than if the sides of the block were perpendicular. It will be obvious, also, that a greater exposure of the surface for observation from below, or at a distance from the mast, could be secured by varying the shape or form of the block to that end,— as, by inverting the conical block, so as to present the inclined sides more nearly perpendicular to the visual rays, where the block is situated at or near the top of a tall mast. But I do not desire to be understood as restricting or confining my invention to the particular form or dimensions of the block shown and described, as the same may be varied as found best adapted to the particular application of the invention.

The desired end of this invention, namely, the indication and ready detection of a current-leak at an insulation by the discoloration or change in appearance of the surface of the block through the action of the leaking current, is effected by coating, covering or treating the surface of the block with some material or substance that possesses the quality or property of being carbonized or being changed in color by the leaking current. A good substance or material for this purpose is white paint, applied to the surface of the block in several coats so as to produce a detecting surface that will withstand the effects of the weather for a considerable period without requiring to be renewed. The surface of the block may also be coated with other kinds of paint compounds, or treated by soaking or immersing the block in any substance that will give or impart to the block the required character of surface, which, as before described, is the characteristic of the leak-indicator of my invention.

The term cross-arm as employed in this description signifies the fixed support carrying the line-insulator or on which it is mounted, whether on a pole, or on a tower; such as is represented in Fig. 1, to carry a number of lines.

In a structure of that character, where the frame-work and the cross-arms as well are of iron, it will be practicable to insert or place the leak-indicator at the junction of the cross-arm with the upright member of the tower to which the cross-arm is bolted. This form or arrangement of the invention is illustrated in Fig. 5, where a block $a^2$ surrounding the insulating bushing 7 is located between the cross arm 2 and the framework 14 of the tower.

Having thus described my invention, what I claim is:

1. A leak-indicator for electrical lines composed of a non-conducting material having a surface exposed to view that is adapted to become visibly changed in appearance under the action of the electrical current thereon,— said indicator being interposed between the line-carrying insulator and the ground, whereby a leakage of current through the line-insulator to the ground will come in contact with the indicator, substantially as described.

2. A leak-indicator for electrical lines composed of material of a non-conducting character having a surface exposed to view coated with a substance that is adapted to become visibly changed in appearance from its normal condition under the action of the electric current,—said indicator being arranged on the fixed support carrying the line, at any point between the insulator and the ground, whereby a leakage of current through the support to the ground will come in contact with the indicator, substantially as described.

RAYMOND S. MASSON.

Witnesses:
 EDWARD E. OSBORN,
 M. REGNER.